United States Patent Office 3,050,565
Patented Aug. 21, 1962

3,050,565
TRINITROALKYL ETHERS
Pliny O. Tawney, Passaic, N.J., assignor to United States Rubber Company, New York, N.Y., a corporation of New Jersey
No Drawing. Filed July 14, 1950, Ser. No. 173,961
9 Claims. (Cl. 260—614)

This invention relates to a new class of chemical compounds, the trinitroalkyl ethers, and a method of making them from vinyl-type ethers and trinitromethane. These new compounds are potentially useful as explosives, propellants and plasticizers for propellants.

The new compounds of my invention are the 1-alkyl-2,2,2-trinitroethyl ethers having the structure $$R-CH_2-CH-O-R'$$
$$|$$
$$C(NO_2)_3$$

where R is a radical selected from the class consisting of hydrogen and alkyl, and R' is a radical selected from the class consisting of alkyl, alkenyl, alkoxyalkyl, carbalkoxyalkyl and aryl. I have found that they can be made by reacting a vinyl-type ether, $$R-CH=CH-O-R'$$

with trinitromethane. The two reagents are brought together, preferably in equimolar proportions. The reaction may be carried out either in a suitable mutual solvent such as diethyl ether or in the absence of a solvent. The solvent need be used only when the product is a solid or a very viscous liquid. As the reaction is exothermic the vinyl-type ether is preferably added to the trinitromethane gradually with cooling and agitation. After the mixing of the reagents is completed the reaction is allowed to continue for a suitable length of time either at room temperature or at any convenient temperature up to 100° C. The trinitroalkyl ether thus formed is conveniently separated and purified by distillation of the solution in vacuo.

The reagent ethers may be any having the structural configuration R—CH=CH—O—R', where R is hydrogen or alkyl and R' is alkyl, alkenyl, alkoxyalkyl, carbalkoxyalkyl or aryl. Such ethers are the vinyl alkyl ethers, vinyl aryl ethers, propenyl alkyl ether, vinyl alkoxyalkyl ethers, vinyl carbalkoxyalkyl ethers, etc.

Some of the compounds covered by this invention are potentially more useful as explosives than as propellants and propellant plasticizers, whereas others of these compounds are potentially useful chiefly in the latter field. The "oxygen balance" of any compound shows in general in which field of usefulness that compound is likely to fall. The oxygen balance is calculated according to the equation:

$$\text{Oxygen balance} = (O - 2C - \tfrac{1}{2}H)\frac{100 \times 16}{M.W.}$$

where O, C and H are the numbers of oxygen, carbon and hydrogen atoms respectively in a compound of molecular weight M.W. The oxygen balance of most of the compounds used as explosives, propellants and propellant plasticizers is negative. In general, nitrogenous compounds with a relatively small negative balance; i.e., below −100, are likely to be useful as explosives, whereas compounds having negative oxygen balances of −200 or even more are often useful as propellant plasticizers whether or not they contain nitrogen. For example trinitrotoluene has an oxygen balance of −74 and dimethyl phthalate, a plasticizer for propellants, has one of −173. As one ascends a homologous carbon series the oxygen balance becomes more negative. Therefore, it is evident that the compounds of this invention in which R and R' contain a total of not more than about five carbon atoms are most likely to be used as explosives, whereas those containing a greater number of carbon atoms will have their chief use as propellant plasticizers. (Oxygen balance of $C_8H_{15}N_3O_7 = -100$; R+R'=5 carbon atoms.)

The compounds of this invention in which R+R' is greater than five in general have higher boiling points; i.e., lower volatility at room temperature, than the lower homologues. This lower volatility, of course, is a desirable property of a plasticizer.

The reaction involved in my method for the preparation of these new compounds is as follows:

$$R-CH=CH-O-R' + HC(NO_2)_3 \longrightarrow R-CH_2-CH-O-R'$$
$$|$$
$$C(NO_2)_3$$

It has been demonstrated by experimentation that the trinitromethyl group adds onto the alpha position in accordance with Markownikoff's rule as shown.

The copending application of Paul F. Hartman Serial No. 173,962, filed of even date herewith, discloses a method which can be used to make the compounds of my invention, except those compounds wherein R' is aryl, and which involves reacting a monohydric alcohol, a monoaldehyde and trinitromethane. It is more advantageous to make many of the compounds of my invention by the method of said Hartman application because of the difficulty of obtaining the necessary vinyl-type ether reagents required by the method of my invention.

In the following examples all parts are by weight except as noted.

EXAMPLE 1

Gaseous vinyl methyl ether is passed into 5 parts (0.033 mol) of trinitromethane with cooling until heat evolution ceases. The reaction mixture is distilled in vacuo to give 3.9 parts of a pale, amber liquid with an ether-like odor, boiling at 63–64° C. at 2 mm. Hg, $n_D^{20}$ 1.4420. The product, methyl 1-methyl-2,2,2-trinitroethyl ether, burns quietly with a blue flame. Impact sensitivity: 2.5 kg. hammer—50 cm.

Analysis.—Calcd. for $C_4H_7N_3O_7$: Carbon 22.97%, hydrogen 3.37%, nitrogen 20.09%. Found: carbon 23.17%, hydrogen 3.41%, nitrogen 20.09%.

EXAMPLE 2

To a solution of 5.0 parts (0.033 mol) of trinitromethane in 10 parts (by vol.) of diethyl ether, 2.85 parts (0.033 mol) of vinyl isopropyl ether are added gradually, causing an immediate evolution of heat. After the exothermic reaction is over the solution is left at room temperature for a short time and is then fractionally distilled in vacuo. The product, isopropyl 1-methyl-2,2,2-trinitroethyl ether, boils at 55–56° C. at 0.5 mm. Hg, $n_D^{20}$ 1.4380. It burns quietly with a blue flame. Impact sensitivity: 2.5 kg. hammer—250 cm.

Analysis.—Calcd. for $C_6H_{11}N_3O_7$: Carbon 30.38%, hydrogen 4.67%, nitrogen 17.72%. Found: Carbon 30.19%, hydrogen 4.49%, nitrogen 17.59%.

In a similar manner trinitromethane can be added to other unsaturated ethers, such as vinyl n-butyl ether, vinyl phenyl ether and propenyl methyl ether.

EXAMPLE 3

This example shows the preparation of a compound within my invention by the method of said Hartman application.

A mixture of 16.7 parts (0.11 mol) trinitromethane, 6.5 parts (0.11 mol) propionaldehyde and 35 parts (by volume) n-propanol is heated at 60° C. (reflux temperature) for an hour and then distilled in vacuo to give 26.7 parts or 97% yield, of n-propyl 1-ethyl-2,2,2-trinitroethyl ether, a water white liquid boiling at 73° C. at 0.8 mm. pressure of Hg, $n_D^{20}$ 1.4428.

*Analysis.*—Calcd. for $C_7H_{13}O_7N_3$: Nitrogen 16.73%. Found: Nitrogen 16.88%.

Physical properties of typical trinitroalkyl ethers made by this process are shown in Table 1. The yields are essentially quantitative in every case, but the percentage conversion varies widely. There appear to be no by-products in this reaction. The unconverted reagents are quantitatively recovered.

*Table 1*

PROPERTIES OF 2,2,2-TRINITROETHYL ETHERS MADE FROM NITROFORM, ALCOHOLS AND ALDEHYDES

| Aldehyde | Alkyl 1-Alkyl-2,2,2-Trinitroethyl Ether [b] | Conversion, percent | Boiling Point | $n_D^{20}$ |
|---|---|---|---|---|
| Acetaldehyde [a] | Methyl 1-methyl- | 33.5 | 59° C. @ 1.5 mm | [c] 1.4420 |
| Do. [a] | n-Propyl 1-methyl- | 65 | 68–69° @ 0.7 mm | 1.4395 |
| Do. [a] | Allyl 1-methyl- | 22 | 66° @ 0.8 mm | 1.4530 |
| Do. [a] | n-Butyl 1-methyl- | 60 | 76° @ 1.0 mm | 1.4410 |
| Do. [a] | β-Methoxyethyl 1-methyl- | 47 | 74.0–74.5° @ 0.4 mm | 1.4460 |
| Do. [a] | β-Acetoxyethyl 1-methyl- | 5 | 112–114° @ 0.5 mm | |
| Do. [a] | β-Ethylhexyl 1-methyl- | 75 | 99.5–101° @ 0.3 mm | 1.4467 |
| Do. [a] | n-Dodecyl 1-methyl- | 77 | 123° @ 0.4 mm | 1.4478 |
| Propionaldehyde | Methyl 1-ethyl- | 30 | 71° @ 1.9 mm | [d] 1.4450 |
| Do. | n-Propyl 1 ethyl- | 97 | 73° @ 0.8 mm | 1.4428 |
| Do. | Isopropyl 1-ethyl- | 26 | 65–66° @ 1.2 mm | 1.4440 |
| n-Butyraldehyde | Methyl 1-propyl- | 32 | 75° @ 1.8 mm | 1.4466 |

[a] Paraldehyde may be used equally well.
[b] Made in each case from the alcohol corresponding to the first radical shown in the product; e.g. methanol, n-propanol, allyl alcohol, n-butanol, etc.
[c] $d^{30}$ 1.3320. This compound is identical with that made from nitroform and methyl vinyl ether as disclosed in Example 1, thus proving the structure of the compound.
[d] $d^{30}$ 1.2608.

I claim:

1. A compound having the formula $$R-CH_2-CH(C(NO_2)_3)-O-R'$$

wherein R is a radical selected from the class consisting of hydrogen and alkyl, and R' is a radical selected from the class consisting of alkyl, lower alkenyl, lower alkoxyalkyl, lower carbalkoxyalkyl and phenyl.

2. Methyl 1-methyl-2,2,2-trinitroethyl ether.
3. Isopropyl 1-methyl-2,2,2-trinitroethyl ether.
4. n-Propyl 1-ethyl-2,2,2-trinitroethyl ether.
5. Allyl 1-methyl-2,2,2-trinitroethyl ether.
6. β-methoxyethyl 1-methyl-2,2,2-trinitroethyl ether.

7. A method of making a compound having the formula $$R-CH_2-CH(C(NO_2)_3)-O-R'$$

wherein R is a radical selected from the class consisting of hydrogen and alkyl, and R' is a radical selected from the class consisting of alkyl, lower alkenyl, lower alkoxyalkyl, lower carbalkoxyalkyl and phenyl which comprises reacting a vinyl-type ether having the formula $$R-CH=CH-O-R'$$

with trinitromethane.

8. The method of claim 7 wherein the ether is methyl vinyl ether.

9. The method of claim 7 wherein the ether is isopropyl vinyl ether.

References Cited in the file of this patent

Copenhaver et al.: "Ethylene and Carbon Monoxide Chemistry," pages 24–25, Reinhold Pub. Corp., N.Y. (1949).